(12) United States Patent
Manolakos et al.

(10) Patent No.: US 12,464,493 B2
(45) Date of Patent: Nov. 4, 2025

(54) REPORTING UE UL TX TIMING QUALITY FOR UL OR DL-UL BASED POSITION METHODS FOR NR POSITIONING

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 18/251,708

(22) PCT Filed: Dec. 27, 2021

(86) PCT No.: PCT/US2021/073115
§ 371 (c)(1),
(2) Date: May 3, 2023

(87) PCT Pub. No.: WO2022/150251
PCT Pub. Date: Jul. 14, 2022

(65) Prior Publication Data
US 2023/0413226 A1    Dec. 21, 2023

(30) Foreign Application Priority Data
Jan. 7, 2021    (GR) .............................. 20210100008

(51) Int. Cl.
*H04W 64/00*    (2009.01)
*H04L 5/00*    (2006.01)

(52) U.S. Cl.
CPC ......... *H04W 64/006* (2013.01); *H04L 5/0051* (2013.01)

(58) Field of Classification Search
CPC . H04W 64/00; H04W 64/006; H04W 56/001; H04W 56/0065; H04W 24/08;
(Continued)

(56) References Cited

U.S. PATENT DOCUMENTS

| 2019/0281574 A1 | 9/2019 | Reial et al. |
| 2020/0137715 A1 | 4/2020 | Edge et al. |

(Continued)

OTHER PUBLICATIONS

3GPP TS 38.214: "3rd Generation Partnership Project, Technical Specification Group Radio Access Network, NR, Physical Layer Procedures for Data (Release 16)", DRAFT38214-G40, V16.4.0, (Dec. 2020), 3GPP, Mobile Competence Centre, 650, Route Des Lucioles, F-06921 Sophia-Antipolis Cedex, France, vol. RAN WG1, No. Jan. 8, 2021, 169 Pages, XP051999688.

(Continued)

*Primary Examiner* — Siu M Lee
(74) *Attorney, Agent, or Firm* — Weaver Austun Villeneuve & Sampson LLP-QUALCOMM

(57) ABSTRACT

Techniques described herein provide for a mobile device communicating a timing quality metric related to an uplink (UL) signal for UL and/or downlink-uplink (DL-UL) positioning techniques. The timing quality metric can be indicative of an accuracy of the transmission timing of one or more reference signals (e.g., in relation to a downlink (DL) signal or other UL reference signal) and may be communicated using an indexed and/or enumerated value. This information can be included as an information element (IE) in a report provided by the mobile device to a receiving network entity or location server.

30 Claims, 6 Drawing Sheets

(58) Field of Classification Search
CPC .... H04W 24/10; H04L 5/0051; H04L 5/0048; G01S 5/021

See application file for complete search history.

(56) References Cited

U.S. PATENT DOCUMENTS

| | | | |
|---|---|---|---|
| 2020/0229125 A1 | 7/2020 | Manolakos et al. | |
| 2020/0344712 A1 | 10/2020 | Akkarakaran et al. | |
| 2020/0374728 A1 | 11/2020 | Manolakos et al. | |
| 2020/0374806 A1 | 11/2020 | Manolakos et al. | |
| 2021/0352613 A1* | 11/2021 | Yoon | H04W 56/001 |
| 2022/0182200 A1* | 6/2022 | Qi | H04W 72/044 |
| 2023/0309042 A1* | 9/2023 | Da | G01S 19/32 |

OTHER PUBLICATIONS

International Search Report and Written Opinion—PCT/US2021/073115—ISA/EPO—Apr. 4, 2022.

OPPO: "Remaining Issues on RS for Positioning", 3GPP Draft, R1-2005979, 3GPP TSG RAN WG1 #102-e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020 (Aug. 7, 2020), XP051915095, 9 Pages, pp. 7-9, Section 2.2, paragraph "NR-Timing Quality".

Qualcomm Incorporated: "DL and UL NR Positioning Procedures", 3GPP TSG-RAN WG2 Meeting #107bis, R2-1913395 (Positioning Procedures + Draft LPP CR), 3GPP, Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019, pp. 1-53, XP051804974, Par. 3, p. 2-5, 5, 6, 7, lines 4-5, 11, 2, 8-20, figure 4, p. 16, paragraph 3.2, Section 3, figure 1.

ETSI: "5G, NR, Physical Layer Procedures for Data (3GPP TS 38.214 Version 16.3.0 Release 16)", 3GPP, Technical Specification Group Radio Access Network; NR, Physical Layer Procedures for Data (Release 16), 3GPP TS 38.214 V16.3.0, Nov. 2020, Oct. 2, 2020, 169 Pages, Sections 5.1.6.3, 5.1.6.5, 5.2.2.5, 5.2.5, 6.1.6.1, 6.1.6.3, 6.2.1, 6.2.1.3, 8, 8.2.

ETSI: "LTE, 5G, LTE Positioning Protocol (LPP) (3GPP TS 37.355 Version 16.2.0 Release 16)", 3GPP, Technical Specification Group Radio Access Network, 3GPP TS 37.355 V16.2.0, ETSI TS 137 355 V16.2.0, Nov. 2020, Oct. 2, 2020, 298 Pages, Sections 6.4.3, 6.5.2.2, 6.5.2.6.

Fraunhofer IIS, et al., "NR DL and UL Positioning: RTT procedure", 3GPP TSG RAN WG2 Meeting #107, R2-1910188, Prague, CZ, Aug. 26, 2019-Aug. 30, 2019, Aug. 15, 2019, 4 Pages.

OPPO: "Remaining Issues on RS for Positioning", 3GPP TSG RAN WG1 #102-e, R1-2005979, e-Meeting, Aug. 17, 2020-Aug. 28, 2020, Aug. 6, 2020, 9 Pages.

Qualcomm Incorporated: "On UE Rx-Tx Time Difference Measurements for NR Positioning", 3GPP TSG-RAN WG4 Meeting #94-e, R4-2000733, 3rd Generation Partnership Project, Mobile Competence Centre, 650, Route Des Lucioles, F-06921 Sophia-Antipolis Cedex, France, vol. Ran WG4, No. Online, Feb. 24, 2020-Mar. 6, 2020, Feb. 14, 2020, XP051850704, 15 pages.

Taiwan Search Report—TW110149210—TIPO—Jul. 29, 2025 .

* cited by examiner

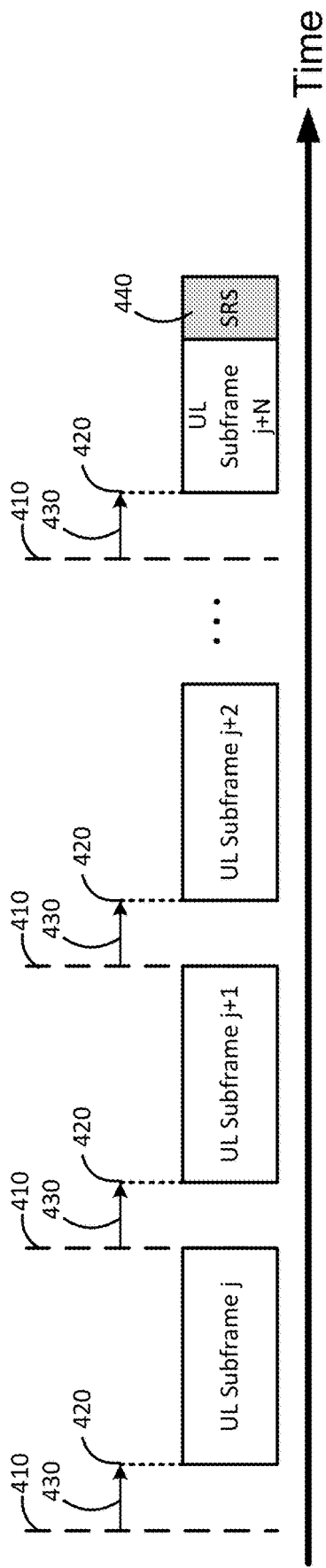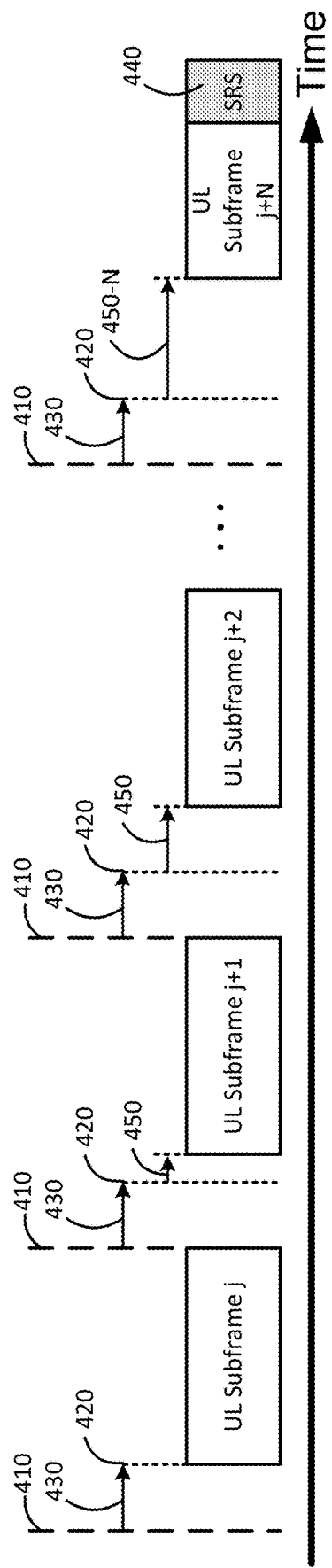

REPORTING UE UL TX TIMING QUALITY FOR UL OR DL-UL BASED POSITION METHODS FOR NR POSITIONING

RELATED APPLICATIONS

This application is a National Phase entry of International Application No. PCT/US21/73115, filed Dec. 27, 2021, entitled "REPORTING UE UL TX TIMING QUALITY FOR UL OR DL-UL BASED POSITION METHODS FOR NR POSITIONING" which claims the benefit of Greek application No. 20210100008, filed Jan. 7, 2021, entitled "Reporting UE UL Tx Timing Quality for UL or DL-UL Based Position Methods for NR Positioning", both of which are assigned to the assignee hereof, and incorporated herein in their entirety by reference.

BACKGROUND

1. Field of Invention

The present invention relates generally to the field of wireless communications, and more specifically to determining the location of a mobile device using radio frequency (RF) signals.

2. Description of Related Art

In a data communication network, various positioning techniques can be used to determine the position of a mobile device (referred to herein as a User Equipment (UE)). Among these techniques are uplink (UL) and downlink-uplink (DL-UL) techniques, in which a mobile device transmits one or more UL reference signals that are received by a network entity (e.g., a base station of the data communication network). To ensure accuracy of the position determination of the mobile device based on the one or more reference signals, factors that can affect the timing of the transmission of the one or more reference signals, such as clock drift or a timing advance (TA) adjustment at the mobile device, can be accounted for.

BRIEF SUMMARY

Embodiments described herein enable a mobile device to communicate a timing quality metric related to an uplink signal for UL and/or DL-UL positioning techniques. The timing quality metric can be indicative of an accuracy of the transmission timing of one or more reference signals (e.g., in relation to a downlink (DL) signal or other UL reference signal) and may be communicated using an indexed and/or enumerated value. This information can be included as an information element (IE) in a message provided by the mobile device to a receiving network entity or location server.

An example method of communicating a timing quality metric for a wireless reference signal transmitted by a user equipment (UE) and used for positioning of the UE in a wireless communication network, according to this disclosure, comprises receiving, at the UE, a configuration to transmit the wireless reference signal, where the configuration is indicative of a time interval between a timing reference and a transmission timing of the wireless reference signal. The method also comprises, responsive to receiving the configuration at the UE, determining, with the UE, the timing quality metric based on the time interval, where the timing quality metric is indicative of an accuracy of the transmission timing of the wireless reference signal. The method also comprises sending, from the UE to a network entity, a message may comprise the timing quality metric, and transmitting the wireless reference signal with the UE.

An example UE, according to this disclosure, comprises a wireless communication interface, a memory, and one or more processors communicatively coupled with the wireless communication interface and the memory. The one or more processors are configured to receive, via the wireless communication interface, a configuration to transmit a wireless reference signal, where the configuration is indicative of a time interval between a timing reference and a transmission timing of the wireless reference signal. The one or more processors are also configured to, responsive to receiving the configuration at the UE, determine a timing quality metric based on the time interval, where the timing quality metric is indicative of an accuracy of the transmission timing of the wireless reference signal. The one or more processors are also configured to send, via the wireless communication interface to a network entity, a message may comprise the timing quality metric, and transmit, via the wireless communication interface, the wireless reference signal.

An example device, according to this disclosure, comprises means for receiving, at the device, a configuration to transmit a wireless reference signal, where the configuration is indicative of a time interval between a timing reference and a transmission timing of the wireless reference signal. The device also comprises means for determining, responsive to receiving the configuration at the device, a timing quality metric based on the time interval, where the timing quality metric is indicative of an accuracy of the transmission timing of the wireless reference signal. The device also comprises means for sending, from the device to a network entity, a message may comprise the timing quality metric, and means for transmitting the wireless reference signal with the device.

An example non-transitory computer-readable medium, according to this disclosure, stores instructions for communicating a timing quality metric for a wireless reference signal transmitted by a UE and used for positioning of the UE in a wireless communication network. The instructions comprising code for receiving, at the UE, a configuration to transmit the wireless reference signal, where the configuration is indicative of a time interval between a timing reference and a transmission timing of the wireless reference signal. The instructions also comprise code for responsive to receiving the configuration at the UE, determining, with the UE, the timing quality metric based on the time interval, where the timing quality metric is indicative of an accuracy of the transmission timing of the wireless reference signal. The instructions also comprise code for sending, from the UE to a network entity, a message may comprise the timing quality metric, and transmitting the wireless reference signal with the UE.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIGS. 4A and 4B are graphs illustrating examples of subframe timing between a UE and base station.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Figure 1:
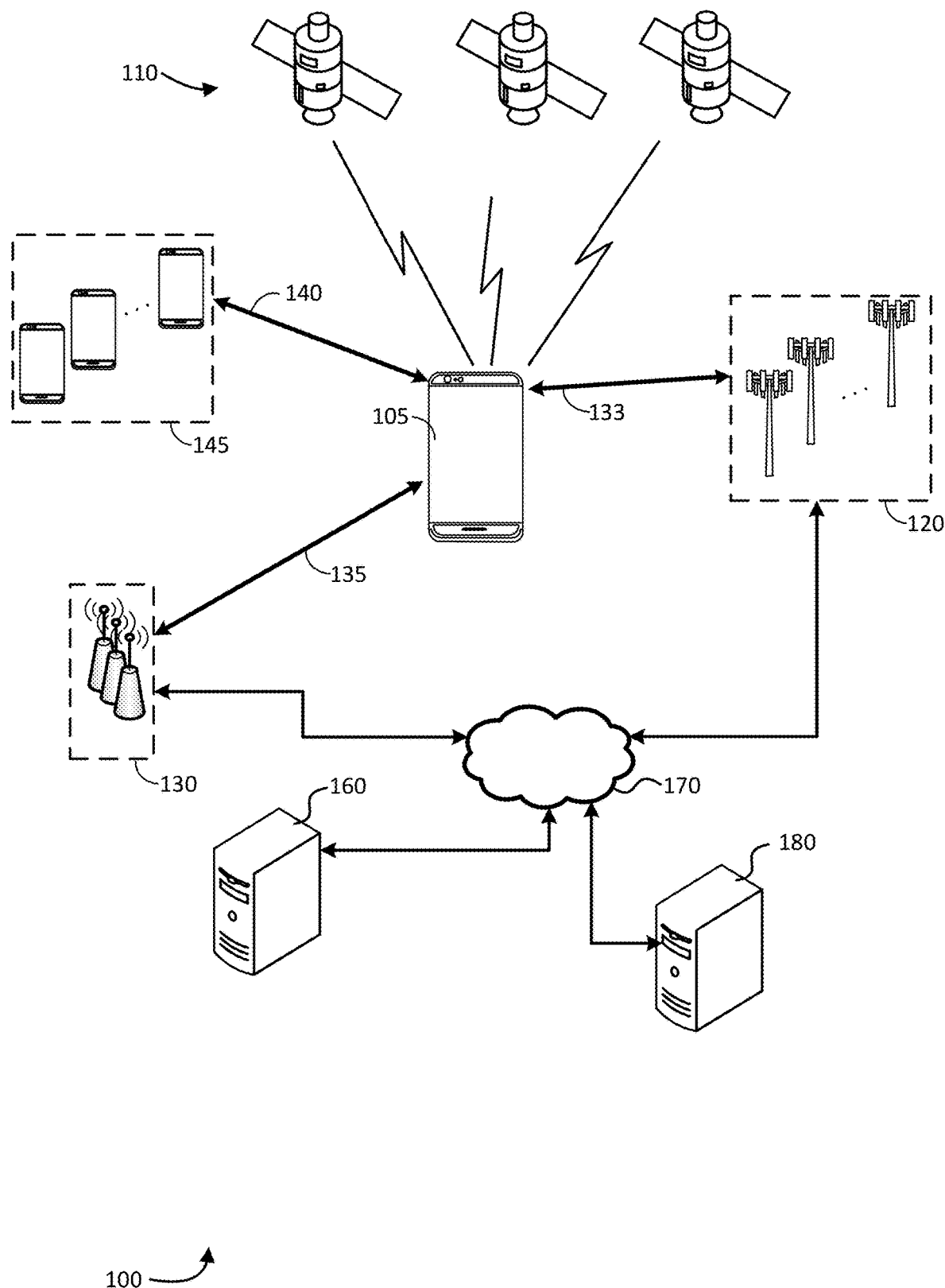
FIG. 1 is a diagram of a positioning system, according to an embodiment.

FIG. 1 is a simplified illustration of a positioning system 100 in which a UE 105, location server 160, and/or other components of the positioning system 100 can use the techniques provided herein for communicating a timing quality metric in determining an estimated location of UE 105 and, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of another UE 145 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

Figure 2:
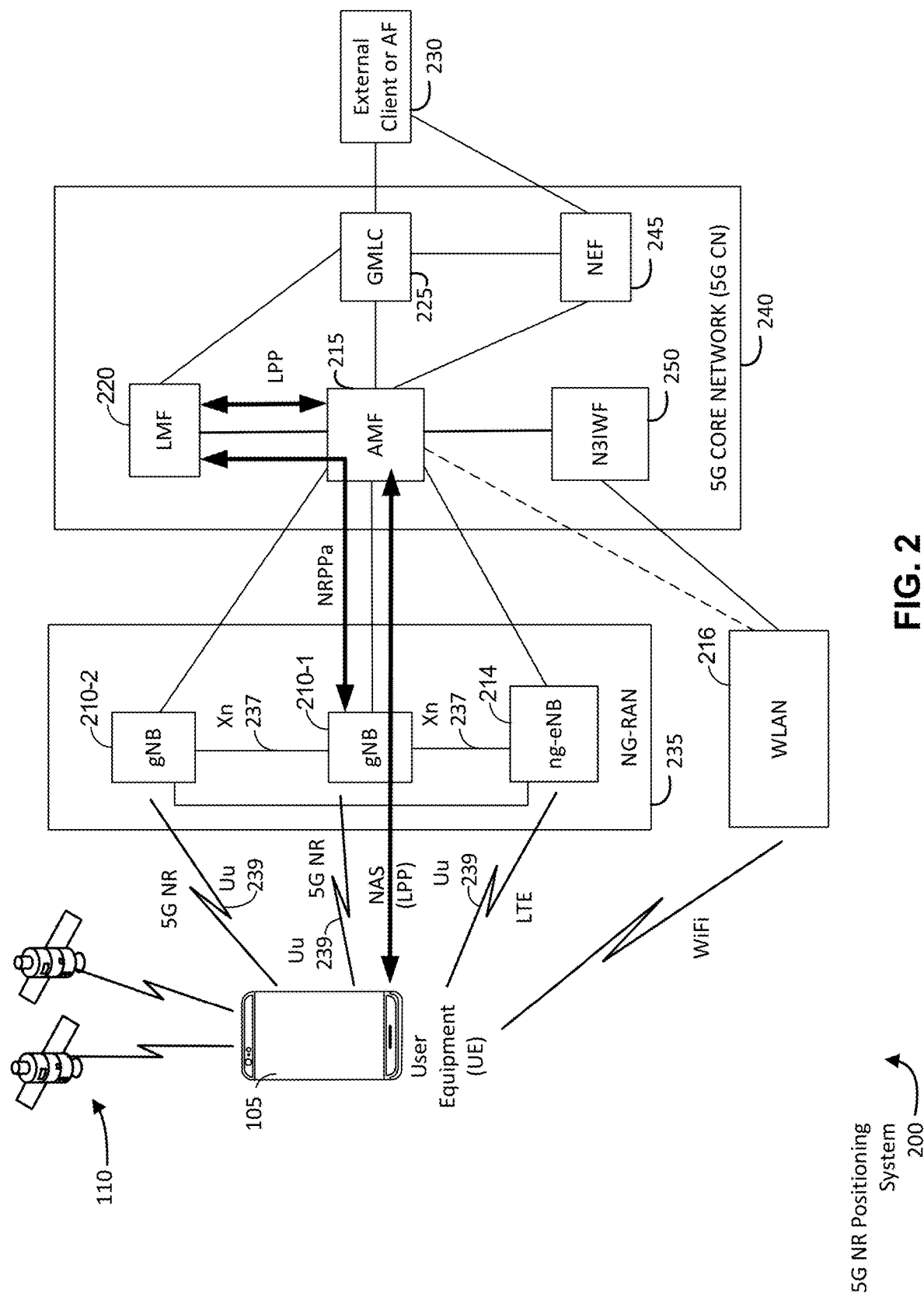
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network-based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
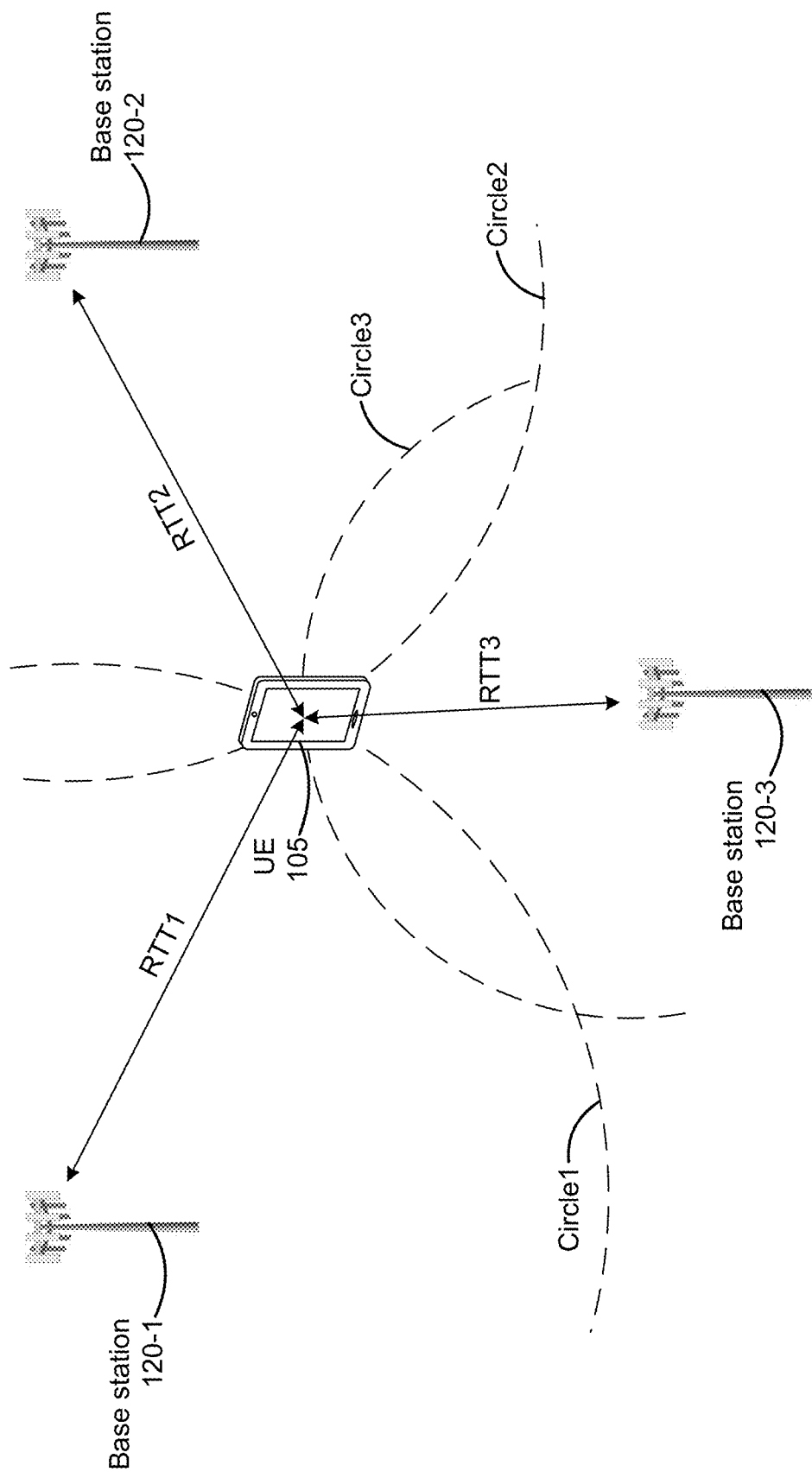
FIG. 3 is a diagram showing round trip signal propagation delay (RTT)-based positioning as an example of DL-UL positioning in which the techniques described herein may be used.

FIG. 3 is an illustration of how RTT-based positioning (or multi-RTT) can be performed, provided here as an example of DL-UL positioning. In brief, RTT-based positioning includes positioning methods in which the position of the UE 105 is determined based on known positions of base stations (e.g., base stations 120), and determined distances between the UE 105 and the base stations and/or other devices. RTT measurements between the UE 105 and each base station are used to determine a distance between the UE 105 and the respective base station, and multilateration can be used to determine the location of the UE 105. It can be noted that, in alternative embodiments, other devices with known locations (e.g., other UEs, other types of TRPs, etc.) can be used in addition or as an alternative to the base stations 120 illustrated in FIG. 3.

In RTT-based positioning, a location server may coordinate RTT measurements between the UE 105 and each base station. Information provided to the UE 105 may be included in RTT assistance data. This can include, for example, reference signal (e.g., PRS) timing and other signal characteristics, base station (cell) ID, and/or other base station related parameters applicable to multi-RTT or some other position method. Depending on desired functionality, RTT measurements may be performed (and initiated by) the UE 105 or a base station 120.

RTT measurements measure distance using Over The Air (OTA) delay. An initiating device (e.g., the UE 105 or a base station 120) transmits a first reference signal at first time, T1, which propagates to a responding device. At a second time, T2, the first reference signal arrives at the responding device. The OTA delay (i.e., the propagation time it takes for the first reference signal to travel from the initiating device to the responding device) is the difference between T1 and T2. The responding device then transmits a second reference signal at a third time, T3, and the second reference signal is received and measured by the initiating device at a fourth time, T4. RSRP measurements may be used to determine TOA for times T2 and T4. Distance, d, between the initiating and responding devices therefore can be determined using the following equation:

$$\frac{2d}{c} = (T_4 - T_1) - (T_3 - T_2) = (T_4 - T_1) + (T_2 - T_3). \quad (1)$$

(As will be appreciated, distance, d, divided by the speed of RF propagation, c, equals the OTA delay.) Thus, a precise determination of the distance between the initiating device and responding device can be performed.

RTT measurements between the UE 105 and base stations 120 can therefore allow the position of the UE 105 to be determined using multilateration. That is, RTT measurements between the UE 105 and the first base station 120-1, second base station 120-2, and third base station 120-3 (RTT measurements RTT1, RTT2, and RTT3, respectively) result in a determination of the distance of the UE 105 from each of the base stations 120. These distances can be used to trace circles around known positions of the base stations 120 (where Circle1 corresponds to base station 120-1, Circle2 corresponds to base station 120-2, and Circle3 corresponds to base station 120-3.) The position of the UE 105 can be determined as the intersection between the circles.

As a person of ordinary skill in the art will appreciate, the timing of the transmission of reference signals used for RTT and/or other measurements can be important in determining the position of the UE 105 accurately. Differences in the timing between initiating and responding devices, for example, can result in inaccuracies of to RTT measurements. Not only is this true in DL-UL positioning techniques such as RTT-based positioning, but UL positioning techniques as well. FIGS. 4A and 4B illustrate this problem further, with regard to positioning in 5G NR.

FIG. 4A a is a graph illustrating timing at a base station 120 of various UL subframes transmitted by a UE 105 and received at the base station 120. In 5G NR, data and signaling communicated between a UE 105 and base station 120 are conveyed using an Orthogonal frequency-division multiplexing (OFDM) regime in which communication is divided into frames (not shown) and subframes. Each subframe may be 1 ms in length. A timing difference between the start 410 of a DL subframe (a first detected path in time for the DL subframe) transmitted by the base station 120 and the start 420 of a UL subframe received by the base station 120 can be due to propagation delay 430, which can be used as a timing reference in the determination of the position of the UE 105.

The difference between the time a DL subframe is received at the UE 105 and the time the UE 105 transmits a UL subframe can be measured and reported by the UE 105 to the base station 120. This provides a timing reference to the base station 120 for a subsequent UL reference signal transmitted by the mobile device. The 5G NR specification, for example, allows the UE 105 to provide a UE Rx-Tx time difference indicative of a difference in time the UE 105 receives a DL subframe #i from the base station 120 and a time the UE 105 transmits a UL subframe #j that is closest in time with subframe #i. This can be used as a timing reference when determining propagation delay 430 based on an SRS 440 (or other reference signal) subsequently transmitted by the UE 105 and received by the base station 120. That is, using the UE Rx-Tx time difference reported in reference to UL subframe j, a time at which the SRS 440 was received by the base station 120 in a subsequent UL subframe j+N, and a time within the UL subframe j+N (e.g., one or more OFDM symbols) during which the SRS 440 was transmitted, the propagation delay 430 can be determined, and, in turn, the distance between the UE 105 and base station 120. This determination can be made by the base station 120 or a location server (e.g., LMF 220) that receives the UE Rx-Tx time difference from the UE 105 and SRS time measurement from the base station 120.

It can be noted, however, that the reliability of the UE Rx-Tx time difference as a time reference may decrease over time. That is, if the UE provides the UE Rx-Tx time difference at UL subframe j and transmits the SRS 440 at subframe j+N, the reliability of UE Rx-Tx time difference may decrease as the integer N increases, due to one or more factors discussed below. This concept is illustrated in more detail in FIG. 4B.

FIG. 4B is a graph illustrating timing of UL subframes relative to the start 410 of a DL subframes, similar to FIG. 4A. Here, however, because of clock drift at the UE, a delay 450 (in addition to the propagation delay 430) accumulates over time. The delay at subframe j (not shown) may be minimal, so if the SRS 440 were transmitted at subframe j (the frame in which the UE 105 provides the UE Rx-Tx time difference), this delay due to clock drift may be negligible. However, because the clock drift accumulates over time, and because the SRS 440 is transmitted at subframe j+N, there is a significant delay 450-N that is unaccounted for in the UE Rx-Tx time difference calculated with reference to the timing at subframe j. Thus, any determination of the range (e.g., by the base station 120 or a location server) based on a measurement at the base station 120 of SRS 440 transmitted in subframe j+N may incorrectly attribute this delay 450-N to propagation delay 430, which may ultimately cause errors in the position determination of the UE 105.

It can be noted that other effects may contribute to the delay 450-N. For example, an adjustment of a timing advance (TA) of the UE 105, which can be done autonomously by the UE 105 or as a result of a command from another device, can impact the relative timing of UL and DL subframes. Further, the effects of TA adjustments and/or time drift may not necessarily result in a delay. For example, a time drift at the UE 105 may result in UL subframes being transmitted progressively earlier, rather than later. In any case, these effects can impact the accuracy of a position determination based on the transmission of one or more UL reference signals (e.g., SRS 440).

According to embodiments herein, a UE 105 may determine a timing quality metric indicative of an accuracy of the timing of the transmission timing of a UL reference signal used in UL-based or DL-UL-based positioning. The timing quality metric can then be provided to a network entity to use when estimating the position of the UE 105. Example, the network entity can determine whether to use the UL reference signal (e.g., if the timing quality metric indicates the UL reference signal meets a minimum threshold timing accuracy), and/or how the accuracy of the transmission timing of the UL reference signal timing may ultimately impact the accuracy of the position estimate.

Depending on desired functionality, the network entity to which the timing quality metric is provided may comprise a base station 120 or location server. According to some embodiments, this may be dependent on the type of positioning used (e.g., UE based, UE assisted, UL based, DL-UL based, etc.) Further, according to some embodiments, the timing quality metric may be provided in a report communicated by the UE 105 as part of a positioning session (e.g., with the location server).

The determination of a timing quality metric corresponding to a UL reference signal can be made by the UE 105 based on known conditions that may impact the timing quality for the reference signal. For example, based on a difference in time between a timing reference (e.g., a UE Rx-Tx time difference reported for UL subframe j in FIG. 4B) and the corresponding UL reference signal (e.g., SRS 440 in FIG. 4B), the UE 105 can determine a maximum/worst-case time drift of a clock used by the UE to transmit the UL reference signal, and indicate an accuracy the transmission timing of the UL reference signal based on this calculation (e.g., indicating that the UL reference signal may be subject to the calculated maximum type drift). Time drift for a given UE 105 is known by the UE 105, and further may be based on current operating conditions (e.g., current temperatures). Other conditions (e.g., TA adjustments) may also be factored into the determination of the accuracy the transmission timing of the UL reference signal. As an example, if a 105 UE determines that it experiences a TA adjustment (e.g., changing the UL timing by 1 nsec earlier or later, or, more generically, by a function of $2^N*Tc$, where N is integer, and Tc=0.5 nsec) between a timing reference (e.g., a UE Rx-Tx time difference reported for UL subframe j in FIG. 4B) and the corresponding UL reference signal (e.g., SRS 440 in FIG. 4B), the UE 105 could use this information to decrease the quality of the UL Timing measurement by an amount reflective of the adjustment.

According to some embodiments, the timing quality metric may be conveyed in an information element (IE) included in a report or other message to the receiving network entity. Table 1 below includes example field descriptions for values that could be included conveyed in an example NR-TimingQuality IE that could be used in 5G NR applications.

TABLE 1

Example 5G NR IE Field Descriptions
NR-TimingQuality Field Descriptions timingQualityValue
This field provides an estimate of uncertainty of the timing value for which the IE NR-timing quality is provided in units of meters.
timingQualityResolution
This field provides the resolution used in the timingQualityValue field. Enumerated values mdot1, m1, m10, m30 corresponds to 0.1, 1, 10, 30 m, respectively.

According to Table 1, the NR-TimingQuality IE can indicate an accuracy of the transmission timing of the UL reference signal in terms of meters or another distance metric, although alternative embodiments may indicate the accuracy in terms of time. Further, the accuracy may be indicated as one of a plurality of enumerated values. Of course, this is provided as a non-limiting example, and alternative embodiments may vary in which values are conveyed, and how.

The enumerated values in Table 1 are example values, and newer implementations may be reflective of higher timing resolution in 5G NR implementations. Table 2, below, includes values that include higher timing resolution, according to an embodiment.

TABLE 2

Example 5G NR IE Field Descriptions

| Value | Meter |
|-------|-------|
| mdot01 | 0.01 |
| mdot05 | 0.05 |
| mdot1 | 0.1 |
| m1 | 1 |
| m10 | 10 |
| m30 | 30 |

Additionally, these higher-resolution values may be smaller than values used to report DL timing quality of a DL reference signal (e.g., in DL-UL positioning methods). That is, according to existing techniques, a UE can measure a DL timing quality of a DL reference signal and report the DL timing quality to a location server or base station using enumerated values where the smallest value (highest resolution) is 0.1 m. However, the UE may also determine a timing quality metric for a UL reference signal (according to embodiments herein) and report the timing quality metric to the location server or base station (possibly in the same report as the DL timing quality) using the set of higher-resolution values indicated in Table 2. In other words, according to some embodiments, a first set of enumerated values for indicating the timing quality metric for the wireless reference signal comprise values indicative of smaller errors than a second set of enumerated values for indicating the quality of the DL signal.

As noted in the previously-described embodiments, the accuracy of the timing quality metric can vary, depending on the length of a time interval between a timing reference and the transmission of the UL reference signal. Further, although a timing reference provided by the UE may indicate a timing reference with regard to base station timing (e.g., UE Rx-Tx time difference, indicating timing between UL and DL subframes) embodiments are not so limited. For example, in embodiments in which UL reference signals are transmitted periodically, the timing quality metric may be indicative of a timing accuracy of a UL reference signal with respect to an earlier UL reference signal. Additionally or alternatively, embodiments may indicate the accuracy of the transmission timing of the UL reference signal with respect to a universal clock/time.

The type of UL reference signal used by the UE may vary, and may be dependent, for example, on a type of positioning used and/or measurements to be taken by the base station 120. According to some embodiments, the UL reference signal may comprise an SRS, a Physical Uplink Control Channel (PUCCH), Physical Uplink Shared Channel (PUSCH), Physical Sidelink Shared Channel (PSSCH), Demodulation Reference Signal (DMRS), or Sidelink Reference Signal (SL RS) (e.g., SL CSI-RS). Additional or alternative reference signals may be used, depending on desired functionality.

According to some embodiments, the timing quality metric provided by the UE may be indicative of an accuracy of a transmission timing of each wireless reference signal of a plurality of wireless reference signals. For example, the scenario illustrated in FIG. 4B may be repeated where a UE transmits a series of SRS signals 440. If the timing quality metric for all SRS signals is the same (e.g., if the value of N is the same for all signals), then the UE may report a single timing quality metric for all SRS signals. In such instances, the UE may provide the timing quality metric along with an indication of the signals to which the timing quality metric applies.

Figure 5:
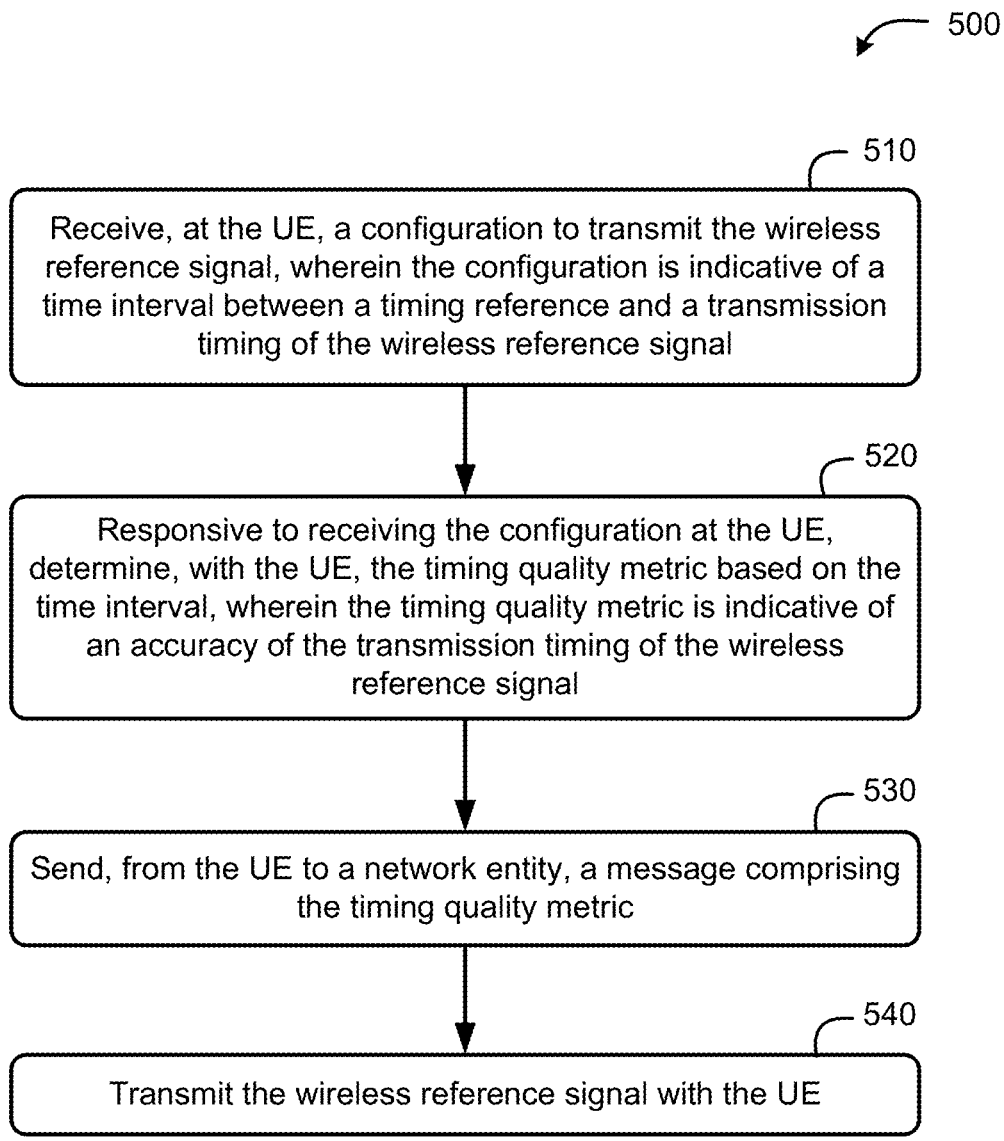
FIG. 5 is a flow diagram of communicating a timing quality metric for a wireless reference signal transmitted by a UE and used for positioning of the UE in a wireless communication network, according to an embodiment.

FIG. 5 is a flow diagram of a method 500 of communicating a timing quality metric for a wireless reference signal transmitted by a UE and used for positioning (e.g., of the UE and/or another wireless device) in a wireless communication network, according to an embodiment. As indicated in the previously-described embodiments positioning may include determining an absolute or relative position of a UE. Positioning may therefore comprise ranging, or determining a range, between the UE and another wireless device. Means for performing the functionality illustrated in one or more of the blocks shown in FIG. 5 may be performed by hardware and/or software components of a UE. Example components of a UE are illustrated in FIG. 6, which are described in more detail below.

At block 510, the functionality comprises receiving, at the UE, a configuration to transmit the wireless reference signal, wherein the configuration is indicative of a time interval between a timing reference and the wireless reference signal. As noted, a timing reference may comprise a timing of a UL subframe, slot, or frame boundary of the UE (e.g., in reference to a DL subframe, as indicated by a UE Rx-Tx time difference); or may comprise a transmission timing of another wireless reference signal, such as a previously-transmitted wireless reference signal in a series of wireless reference signals.

As previously noted, a UE may be configured by a base station and/or location server to transmit the wireless reference signal. From this configuration, the UE may be able to determine an interval between a timing reference and a wireless reference signal, which can be used to determine the timing quality metric. As discussed previously with regard to the examples illustrated in FIGS. 4A and 4B, for example, the timing quality metric may be dependent on a value of N, where N is the number of subframes between a timing reference (UE Rx-Tx time difference) provided in reference to UL subframe j, and a wireless reference transmitted at UL subframe j+N. For embodiments in which the timing reference comprises a previously-transmitted wireless reference signal, the interval between the timing reference and wireless reference signal may comprise the periodicity between wireless reference signal transmissions.

Figure 6:
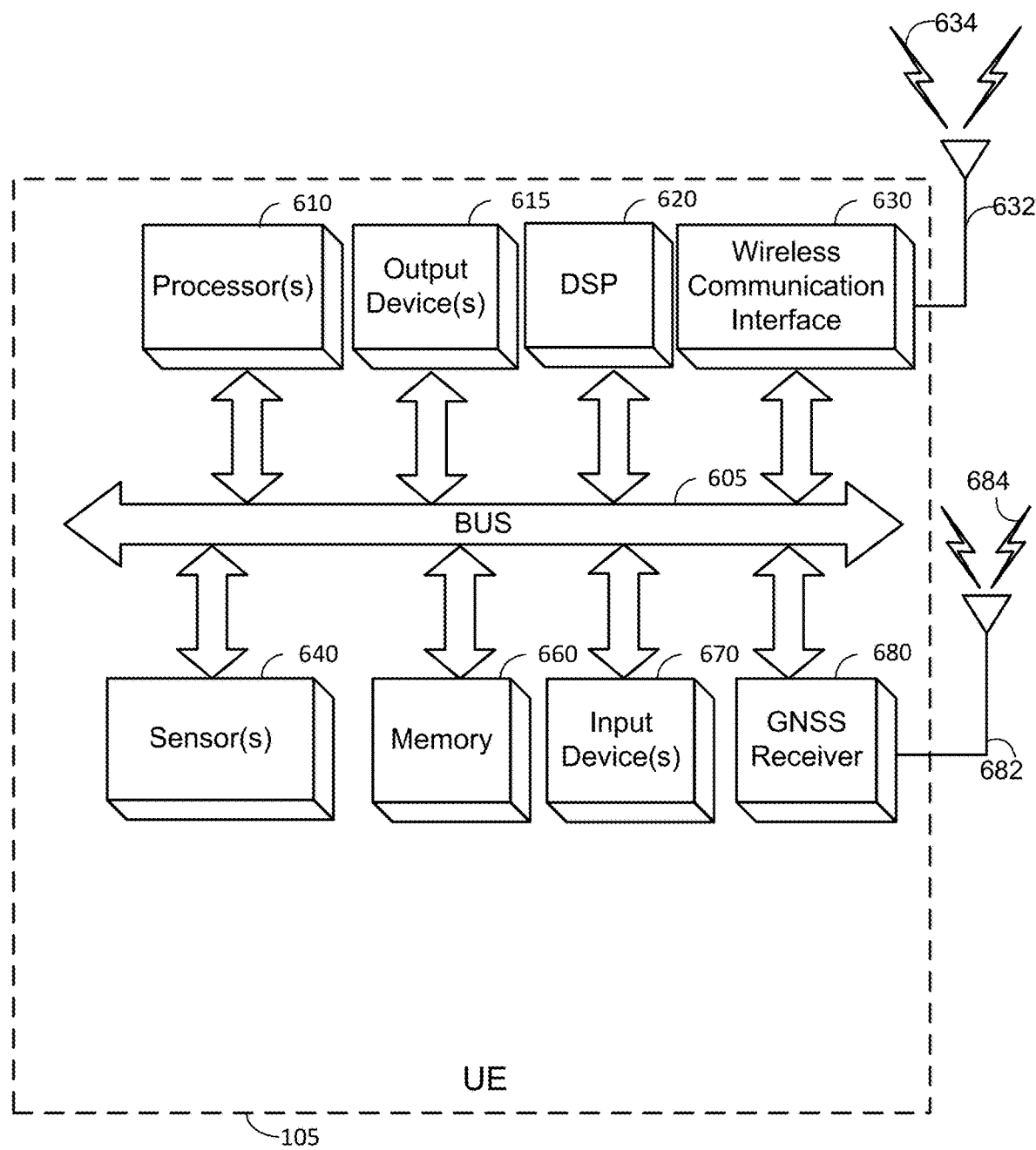
FIG. 6 is a block diagram of an embodiment of a UE, which can be utilized in embodiments as described herein.

Means for performing functionality at block 510 may comprise a bus 605, wireless communication interface 630, digital signal processor (DSP) 620, processor(s) 610, and/or other components of a UE 105, as illustrated in FIG. 6.

At block 520, the functionality comprises responsive to receiving the configuration at the UE, determining, with the UE, the timing quality metric based on the time interval, wherein the timing quality metric is indicative of an accuracy of the transmission timing of the wireless reference signal. As discussed in the embodiments provided herein, determining the timing quality metric may be based on a TA adjustment for the UE and/or clock drift of a clock of the UE, which may be known at the time the timing quality metric is determined. (The clock drift may be dependent on the particular UE or particular type of UE, for example.) As noted, the timing quality metric may be determined based on a maximum change in timing that may occur at the UE over the course of the time interval. As further noted in the examples provided herein, the accuracy of the transmission timing of the wireless reference signal may be provided in terms of time or a distance metric (e.g., meters, centimeters, feet, etc.). Moreover, depending on desired functionality, the timing quality metric may indicate an accuracy of the transmission timing of the wireless reference signal using an enumerated value.

Means for performing functionality at block 520 may comprise a bus 605, wireless communication interface 630, DSP 620, processor(s) 610, and/or other components of a UE 105, as illustrated in FIG. 6.

At block 530, the functionality comprises sending, from the UE to a network entity, a message comprising the timing quality metric. As noted, the timing quality metric may be included in a report provided by the UE as part of a positioning session with a base station or location server. Depending on the type of positioning, for example, reports may include different types of information. A measurement report provided by the UE in a position determination using multi-RTT, a measurement report may not only include the timing quality metric of the wireless reference signal transmitted by the UE, but may also include a quality metric of a reference signal received by the UE (e.g., from a base station or other UE). As such, according to some embodiments, the message may comprise a report that further includes an indication of a quality of a DL signal received by the UE.

Means for performing functionality at block 530 may comprise a bus 605, DSP 620, processor(s) 610, and/or other components of a UE 105, as illustrated in FIG. 6.

At block 540, the functionality comprises transmitting the wireless reference signal with the UE. Again, the wireless reference signal provided by the UE may comprise any of a variety of reference signals that can be used for the positioning of the UE in UL- and/or DL-UL-based positioning. Accordingly, according to some embodiments of the method 500, the wireless reference signal may comprise an SRS, PUCCH, PUSCH, PSSCH, DMRS, or SL RS.

The network entity to which the message is sent and an entity that receives the wireless reference signal may comprise any combination of devices, which may be dependent on the type of positioning used and/or other factors. For example, the network entity at block 530 may comprise a location server, a serving TRP (e.g., a serving base station) of the UE, a neighboring TRP (e.g., neighboring TRP) of the UE, or another UE. The wireless reference signal transmitted by the UE may be received by a serving TRP of the UE, a neighboring TRP of the UE, or another UE. In some instances, the network entity that receives the message at block 530 may be the same entity that receives the wireless reference signal at block 540. In other instances, the network entity and receiving entity may be different. The configuration received by the UE at block 510 may also be the same device, or a different device. Accordingly, according to some embodiments of the method 500, the UE may receive the configuration from a location server or from the serving TRP of the UE.

Means for performing functionality at block 540 may comprise a bus 605, wireless communication interface 630, DSP 620, processor(s) 610, and/or other components of a UE 105, as illustrated in FIG. 6.

FIG. 6 is a block diagram of an embodiment of a UE 105, which can be utilized as described herein above (e.g., in association with FIGS. 1-5). For example, the UE 105 can perform one or more of the functions of the method shown in FIG. 5. It should be noted that FIG. 6 is meant only to provide a generalized illustration of various components, any or all of which may be utilized as appropriate. It can be noted that, in some instances, components illustrated by FIG. 6 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 6.

The UE 105 is shown comprising hardware elements that can be electrically coupled via a bus 605 (or may otherwise be in communication, as appropriate). The hardware elements may include a processor(s) 610 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 610 may comprise one or more processing units, which may be housed in a single integrated circuit (IC) or multiple ICs. As shown in FIG. 6, some embodiments may have a separate DSP 620, depending on desired functionality. Location determination and/or other determinations based on wireless communication may be provided in the processor(s) 610 and/or wireless communication interface 630 (discussed below). The UE 105 also can include one or more input devices 670, which can include without limitation one or more keyboards, touch screens, touch pads, microphones, buttons, dials, switches, and/or the like; and one or more output devices 615, which can include without limitation one or more displays (e.g., touch screens), light emitting diodes (LEDs), speakers, and/or the like.

The UE 105 may also include a wireless communication interface 630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 630 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 632 that send and/or receive wireless signals 634. According to some embodiments, the wireless communication antenna(s) 632 may comprise a plurality of discrete antennas, antenna arrays, or any combination thereof. The antenna(s) 632 may be capable of transmitting and receiving wireless signals using beams (e.g., Tx beams and Rx beams). Beam formation may be performed using digital and/or analog beam formation techniques, with respective digital and/or analog circuitry. The wireless communication interface 630 may include such circuitry.

Depending on desired functionality, the wireless communication interface 630 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 640. Sensor(s) 640 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 680 capable of receiving signals 684 from one or more GNSS satellites using an antenna 682 (which could be the same as antenna 632). Positioning based on GNSS signal measurement can be utilized to complement and/or incorporate the techniques described herein. The GNSS receiver 680 can extract a position of the UE 105, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 680 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 680 is illustrated in FIG. 6 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 610, DSP 620, and/or a processor within the wireless communication interface 630 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 610 or DSP 620.

The UE 105 may further include and/or be in communication with a memory 660. The memory 660 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 660 of the UE 105 also can comprise software elements (not shown in FIG. 6), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 660 that are executable by the UE 105 (and/or processor(s) 610 or DSP 620 within UE 105). In some embodiments, then, such code and/or instructions can be used to configure and/or adapt a general-purpose computer (or other device) to perform one or more operations in accordance with the described method.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments.

Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of communicating a timing quality metric for a wireless reference signal transmitted by a user equipment (UE) and used for positioning in a wireless communication network, the method comprising:
    receiving, at the UE, a configuration to transmit the wireless reference signal, wherein the configuration is indicative of a time interval between a timing reference and a transmission timing of the wireless reference signal;
    responsive to receiving the configuration at the UE, determining, with the UE, the timing quality metric based on the time interval, wherein the timing quality metric is indicative of an accuracy of the transmission timing of the wireless reference signal;
    sending, from the UE to a network entity, a message comprising the timing quality metric; and
    transmitting the wireless reference signal with the UE.

Clause 2: The method of clause 1, wherein the timing quality metric indicates the accuracy of the transmission timing of the wireless reference signal in terms of a distance metric.

Clause 3: The method of clause 1 or 2, wherein the timing quality metric indicates the accuracy of the transmission timing of the wireless reference signal using an enumerated value.

Clause 4: The method of any of clauses 1-3, wherein the message comprises a report that further includes an indication of a quality of a downlink (DL) signal received by the UE.

Clause 5: The method of clause 4, wherein a first set of enumerated values for indicating the timing quality metric for the wireless reference signal comprise values indicative of smaller errors than a second set of enumerated values for indicating the quality of the DL signal.

Clause 6: The method of any of clauses 1-5, wherein the timing reference comprises:
    a timing of an uplink (UL) subframe, slot, or frame boundary of the UE; or
    a transmission timing of another wireless reference signal; or
    both.

Clause 7: The method of any of clauses 1-6, wherein:
    the timing reference comprises a UE Rx-Tx time difference indicative of a measurement by the UE of a difference in time between a first detected path in time of a DL subframe received at the UE and a beginning of a UL subframe closest in time to the DL subframe; and
    the timing quality metric is indicative of a time difference between a first timing used in determining of the UE Rx-Tx time difference and a second timing used to transmit the wireless reference signal.

Clause 8: The method of any of clauses 1-7, wherein:
    the wireless reference signal is one of a plurality of wireless reference signals transmitted by the UE; and
    the timing quality metric is indicative of an accuracy of a transmission timing of more than one wireless reference signal of the plurality of wireless reference signals.

Clause 9: The method of any of clauses 1-8, wherein the timing quality metric is further based on:
    a Timing Advance (TA) adjustment for the UE,
    a clock drift of a clock of the UE, or
    both.

Clause 10: The method of any of clauses 1-9, wherein the wireless reference signal comprises:
    a Sounding Reference Signal (SRS),
    a Physical Uplink Control Channel (PUCCH),
    Physical Uplink Shared Channel (PUSCH),
    Physical Sidelink Shared Channel (PSSCH),
    Demodulation Reference Signal (DMRS), or
    Sidelink Reference Signal (SL RS).

Clause 11: The method of any of clauses 1-10, wherein the network entity comprises:
    a location server,
    a serving transmission reception point (TRP) of the UE
    a neighboring TRP of the UE, or
    another UE.

Clause 12: The method of any of clauses 1-11, wherein the wireless reference signal is received by:
  a serving TRP of the UE,
  a neighboring TRP of the UE, or
  another UE.

Clause 13: The method of any of clauses 1-12, wherein the UE receives the configuration from:
  a location server, or
  a serving TRP of the UE.

Clause 14: A user equipment (UE) comprising:
  a wireless communication interface;
  a memory;
  one or more processors communicatively coupled with the wireless communication interface and the memory and configured to:
    receive, via the wireless communication interface, a configuration to transmit a wireless reference signal, wherein the configuration is indicative of a time interval between a timing reference and a transmission timing of the wireless reference signal;
    responsive to receiving the configuration at the UE, determine a timing quality metric based on the time interval, wherein the timing quality metric is indicative of an accuracy of the transmission timing of the wireless reference signal;
    send, via the wireless communication interface to a network entity, a message comprising the timing quality metric; and
    transmit, via the wireless communication interface, the wireless reference signal.

Clause 15: The UE of clause 14, wherein the one or more processors are configured to indicate the accuracy of the transmission timing of the wireless reference signal in the timing quality metric in terms of a distance metric.

Clause 16: The UE of clause 14 or 15, wherein the one or more processors are configured to indicate the accuracy of the transmission timing of the wireless reference signal using an enumerated value.

Clause 17: The UE of any of clauses 14-16, wherein the one or more processors are configured to include, in the message, an indication of a quality of a downlink (DL) signal received by the UE.

Clause 18: The UE of clause 17, wherein the one or more processors are configured to use a first set of enumerated values for indicating the timing quality metric for the wireless reference signal, wherein the first set of enumerated values comprise values indicative of smaller errors than a second set of enumerated values for indicating the quality of the DL signal.

Clause 19: The UE of any of clauses 14-18, wherein the one or more processors are configured to use, as the timing reference:
  a timing of an uplink (UL) subframe, slot, or frame boundary of the UE; or
  a transmission timing of another wireless reference signal; or
  both.

Clause 20: The UE of any of clauses 14-19, wherein:
  the timing reference comprises a UE Rx-Tx time difference indicative of a measurement by the UE of a difference in time between a first detected path in time of a DL subframe received at the UE and a beginning of a UL subframe closest in time to the DL subframe; and
  the timing quality metric is indicative of a time difference between a first timing used in determining the UE Rx-Tx time difference and a second timing used to transmit the wireless reference signal.

Clause 21: The UE of any of clauses 14-20, wherein:
  the wireless reference signal is one of a plurality of wireless reference signals transmitted by the UE; and
  the one or more processors are configured to indicate an accuracy of a transmission timing of more than one wireless reference signal of the plurality of wireless reference signals use the timing quality metric.

Clause 22: The UE of any of clauses 14-20, wherein the one or more processors are configured to base the timing quality metric at least in part on:
  a Timing Advance (TA) adjustment for the UE,
  a clock drift of a clock of the UE, or
  both.

Clause 23: The UE of any of clauses 14-21, wherein, to transmit the wireless reference signal, the one or more processors are configured to transmit:
  a Sounding Reference Signal (SRS),
  a Physical Uplink Control Channel (PUCCH),
  Physical Uplink Shared Channel (PUSCH),
  Physical Sidelink Shared Channel (PSSCH),
  Demodulation Reference Signal (DMRS), or
  Sidelink Reference Signal (SL RS).

Clause 24: The UE of any of clauses 14-23, wherein, to send the message to the network entity, the one or more processors are configured to send the message to:
  a location server,
  a serving transmission reception point (TRP) of the UE
  a neighboring TRP of the UE, or
  another UE.

Clause 25: The UE of any of clauses 14-24, wherein the one or more processors are configured to transmit the wireless reference signal such that it is received by:
  a serving TRP of the UE,
  a neighboring TRP of the UE, or
  another UE.

Clause 26: The UE of any of clauses 14-25, wherein the or more processors are configured to receive the configuration from:
  a location server, or
  a serving TRP of the UE.

Clause 27: A device comprising:
  means for receiving, at the device, a configuration to transmit a wireless reference signal, wherein the configuration is indicative of a time interval between a timing reference and a transmission timing of the wireless reference signal;
  means for determining, responsive to receiving the configuration at the device, a timing quality metric based on the time interval, wherein the timing quality metric is indicative of an accuracy of the transmission timing of the wireless reference signal;
  means for sending, from the device to a network entity, a message comprising the timing quality metric; and
  means for transmitting the wireless reference signal with the device.

Clause 28: The device of clause 27, wherein the means for determining the timing quality metric include means for indicating the accuracy of the transmission timing of the wireless reference signal in terms of a distance metric.

Clause 29: The device of clause 27 or 28, wherein the means for determining the timing quality metric include means for indicating the accuracy of the transmission timing of the wireless reference signal using an enumerated value.

Clause 30: The device of any of clauses 27-29, wherein the means for sending the message comprise means for including, in the message, an indication of a quality of a downlink (DL) signal received by the device.

Clause 31: The device of clause 30, wherein the means for determining the timing quality metric include means for indicating the accuracy of the wireless reference signal using a first set of enumerated values indicative of smaller errors than a second set of enumerated values used for indicating the quality of the DL signal.

Clause 32: The device of any of clauses 27-31, wherein the means for receiving the configuration comprise means for using, as the timing reference:
- a timing of an uplink (UL) subframe, slot, or frame boundary of the device; or
- a transmission timing of another wireless reference signal; or
- both.

Clause 33: The device of any of clauses 27-32, wherein:
- the timing reference comprises a device Rx-Tx time difference indicative of a measurement by the device of a difference in time between a first detected path in time of a DL subframe received at the device and a beginning of a UL subframe closest in time to the DL subframe; and
- the means for determining the timing quality metric comprise means for including, in the timing quality metric, an indication of a time difference between a first timing used in determining the device Rx-Tx time difference and a second timing used to transmit the wireless reference signal.

Clause 34: The device of any of clauses 27-33, wherein:
- the wireless reference signal is one of a plurality of wireless reference signals transmitted by the device; and
- the means for determining the timing quality metric comprise means for indicating an accuracy of a transmission timing of more than one wireless reference signal of the plurality of wireless reference signals with the timing quality metric.

Clause 35: The device of any of clauses 27-34, wherein the means for determining the timing quality metric comprise means for basing the timing quality metric at least in part on:
- a Timing Advance (TA) adjustment for the device,
- a clock drift of a clock of the device, or
- both.

Clause 36: The device of any of clauses 27-35, wherein the means for transmitting the wireless reference signal comprise means for transmitting:
- a Sounding Reference Signal (SRS),
- a Physical Uplink Control Channel (PUCCH),
- Physical Uplink Shared Channel (PUSCH),
- Physical Sidelink Shared Channel (PSSCH),
- Demodulation Reference Signal (DMRS), or
- Sidelink Reference Signal (SL RS).

Clause 37: The device of any of clauses 27-36, wherein the means for sending the message to the network entity comprise means for sending the message to:
- a location server,
- a serving transmission reception point (TRP) of the device
- a neighboring TRP of the device, or
- another device.

Clause 38: The device of any of clauses 27-37, wherein the means for transmitting the wireless reference signal comprise means for transmitting the wireless reference signal such that it is received by:
- a serving TRP of the device,
- a neighboring TRP of the device, or
- another device.

Clause 39: The device of any of clauses 27-38, wherein the means for receiving the configuration comprise means for receiving the configuration from:
- a location server, or
- a serving TRP of the device.

Clause 40: A non-transitory computer-readable medium storing instructions for communicating a timing quality metric for a wireless reference signal transmitted by a user equipment (UE), the instructions comprising code for:
- receiving, at the UE, a configuration to transmit the wireless reference signal, wherein the configuration is indicative of a time interval between a timing reference and a transmission timing of the wireless reference signal;
- responsive to receiving the configuration at the UE, determining, with the UE, the timing quality metric based on the time interval, wherein the timing quality metric is indicative of an accuracy of the transmission timing of the wireless reference signal;
- sending, from the UE to a network entity, a message comprising the timing quality metric; and
- transmitting the wireless reference signal with the UE.

Clause 41: The non-transitory computer-readable medium of clause 40, wherein the code for determining the timing quality metric comprises code for indicating the accuracy of the transmission timing of the wireless reference signal in terms of a distance metric.

Clause 42: The non-transitory computer-readable medium of clause 40 or 41, wherein the code for determining the timing quality metric comprises code for indicating the accuracy of the transmission timing of the wireless reference signal using an enumerated value.

Clause 43: The non-transitory computer-readable medium of any of clauses 40-42, wherein the code for sending the message comprises code for including, in the message, an indication of a quality of a downlink (DL) signal received by the UE.

Clause 44: The non-transitory computer-readable medium of clause 43, wherein the code for determining the timing quality metric comprises code for indicating the accuracy using a first set of enumerated values indicative of smaller errors than a second set of enumerated values for indicating the quality of the DL signal.

Clause 45: The non-transitory computer-readable medium of any of clauses 40-44, wherein the code for receiving the configuration comprises code for using, as the timing reference:
- a timing of an uplink (UL) subframe, slot, or frame boundary of the UE; or
- a transmission timing of another wireless reference signal; or
- both.

Clause 46: The non-transitory computer-readable medium of any of clauses 40-45, wherein:
- the timing reference comprises a UE Rx-Tx time difference indicative of a measurement by the UE of a difference in time between a first detected path in time of a DL subframe received at the UE and a beginning of a UL subframe closest in time to the DL subframe; and
- the code for determining the timing quality metric comprises code for including, in the timing quality metric, a time difference between a first timing used in determining the UE Rx-Tx time difference and a second timing used to transmit the wireless reference signal.

Clause 47: The non-transitory computer-readable medium of any of clauses 40-46, wherein:
the wireless reference signal is one of a plurality of wireless reference signals transmitted by the UE; and
the code for determining the timing quality metric comprise code for indicating an accuracy of a transmission timing of more than one wireless reference signal of the plurality of wireless reference signals with the timing quality metric.

Clause 48: The non-transitory computer-readable medium of any of clauses 40-47, wherein the code for determining the timing quality metric comprises code for basing the timing quality metric at least in part on:
a Timing Advance (TA) adjustment for the UE,
a clock drift of a clock of the UE, or
both.

Clause 49: The non-transitory computer-readable medium of any of clauses 40-48, wherein the code for transmitting the wireless reference signal comprises code for transmitting:
a Sounding Reference Signal (SRS),
a Physical Uplink Control Channel (PUCCH),
Physical Uplink Shared Channel (PUSCH),
Physical Sidelink Shared Channel (PSSCH),
Demodulation Reference Signal (DMRS), or
Sidelink Reference Signal (SL RS).

Clause 50: The non-transitory computer-readable medium of any of clauses 40-49, wherein the code for sending the message to the network entity comprise code for sending the message to:
a location server,
a serving transmission reception point (TRP) of the UE
a neighboring TRP of the UE, or
another UE.

Clause 51: The non-transitory computer-readable medium of any of clauses 40-50, wherein the code for transmitting the wireless reference signal comprises code for transmitting the wireless reference signal such that it is received by:
a serving TRP of the UE,
a neighboring TRP of the UE, or
another UE.

Clause 52: The non-transitory computer-readable medium of any of clauses 40-51, wherein the code for receiving the configuration comprises code for receiving the configuration from:
a location server, or
a serving TRP of the UE.

What is claimed is:

1. A method of communicating a timing quality metric for a wireless reference signal transmitted by a user equipment (UE) and used for positioning in a wireless communication network, the method comprising:
receiving, at the UE, a configuration to transmit the wireless reference signal, wherein the configuration is indicative of a time interval between a timing reference and a transmission timing of the wireless reference signal;
responsive to receiving the configuration at the UE, determining, with the UE, the timing quality metric based on the time interval, wherein the timing quality metric is indicative of an accuracy of the transmission timing of the wireless reference signal;
sending, from the UE to a network entity, a message comprising the timing quality metric; and
transmitting the wireless reference signal with the UE.

2. The method of claim 1, wherein the timing quality metric indicates the accuracy of the transmission timing of the wireless reference signal in terms of a distance metric.

3. The method of claim 1, wherein the timing quality metric indicates the accuracy of the transmission timing of the wireless reference signal using an enumerated value.

4. The method of claim 1, wherein the message comprises a report that further includes an indication of a quality of a downlink (DL) signal received by the UE.

5. The method of claim 4, wherein a first set of enumerated values for indicating the timing quality metric for the wireless reference signal comprise values indicative of smaller errors than a second set of enumerated values for indicating the quality of the DL signal.

6. The method of claim 1, wherein the timing reference comprises:
a timing of an uplink (UL) subframe, slot, or frame boundary of the UE; or
a transmission timing of another wireless reference signal; or
both.

7. The method of claim 1, wherein:
the timing reference comprises a UE Rx-Tx time difference indicative of a measurement by the UE of a difference in time between a first detected path in time of a DL subframe received at the UE and a beginning of a UL subframe closest in time to the DL subframe; and
the timing quality metric is indicative of a time difference between a first timing used in determining the UE Rx-Tx time difference and a second timing used to transmit the wireless reference signal.

8. The method of claim 1, wherein:
the wireless reference signal is one of a plurality of wireless reference signals transmitted by the UE; and
the timing quality metric is indicative of an accuracy of a transmission timing of more than one wireless reference signal of the plurality of wireless reference signals.

9. The method of claim 1, wherein the timing quality metric is further based on:
a Timing Advance (TA) adjustment for the UE,
a clock drift of a clock of the UE, or
both.

10. The method of claim 1, wherein the wireless reference signal comprises:
a Sounding Reference Signal (SRS),
a Physical Uplink Control Channel (PUCCH),
Physical Uplink Shared Channel (PUSCH),
Physical Sidelink Shared Channel (PSSCH),
Demodulation Reference Signal (DMRS), or
Sidelink Reference Signal (SL RS).

11. The method of claim 1, wherein the network entity comprises:
a location server,
a serving transmission reception point (TRP) of the UE
a neighboring TRP of the UE, or
another UE.

12. The method of claim 1, wherein the wireless reference signal is received by:
a serving TRP of the UE,
a neighboring TRP of the UE, or
another UE.

13. The method of claim 1, wherein the UE receives the configuration from:
a location server, or
a serving TRP of the UE.

14. A user equipment (UE) comprising:
a wireless communication interface;
a memory;
one or more processors communicatively coupled with the wireless communication interface and the memory and configured to:
   receive, via the wireless communication interface, a configuration to transmit a wireless reference signal, wherein the configuration is indicative of a time interval between a timing reference and a transmission timing of the wireless reference signal;
   responsive to receiving the configuration at the UE, determine a timing quality metric based on the time interval, wherein the timing quality metric is indicative of an accuracy of the transmission timing of the wireless reference signal;
   send, via the wireless communication interface to a network entity, a message comprising the timing quality metric; and
   transmit, via the wireless communication interface, the wireless reference signal.

15. The UE of claim 14, wherein the one or more processors are configured to indicate the accuracy of the transmission timing of the wireless reference signal in the timing quality metric in terms of a distance metric.

16. The UE of claim 14, wherein the one or more processors are configured to indicate the accuracy of the transmission timing of the wireless reference signal using an enumerated value.

17. The UE of claim 14, wherein the one or more processors are configured to include, in the message, an indication of a quality of a downlink (DL) signal received by the UE.

18. The UE of claim 17, wherein the one or more processors are configured to use a first set of enumerated values for indicating the timing quality metric for the wireless reference signal, wherein the first set of enumerated values comprise values indicative of smaller errors than a second set of enumerated values for indicating the quality of the DL signal.

19. The UE of claim 14, wherein the one or more processors are configured to use, as the timing reference:
a timing of an uplink (UL) subframe, slot, or frame boundary of the UE; or
a transmission timing of another wireless reference signal; or
both.

20. The UE of claim 14, wherein:
the timing reference comprises a UE Rx-Tx time difference indicative of a measurement by the UE of a difference in time between a first detected path in time of a DL subframe received at the UE and a beginning of a UL subframe closest in time to the DL subframe; and
the timing quality metric is indicative of a time difference between a first timing used in determining the UE Rx-Tx time difference and a second timing used to transmit the wireless reference signal.

21. The UE of claim 14, wherein:
the wireless reference signal is one of a plurality of wireless reference signals transmitted by the UE; and
the one or more processors are configured to indicate an accuracy of a transmission timing of more than one wireless reference signal of the plurality of wireless reference signals use the timing quality metric.

22. The UE of claim 14, wherein the one or more processors are configured to base the timing quality metric at least in part on:
a Timing Advance (TA) adjustment for the UE,
a clock drift of a clock of the UE, or
both.

23. The UE of claim 14, wherein, to transmit the wireless reference signal, the one or more processors are configured to transmit:
a Sounding Reference Signal (SRS),
a Physical Uplink Control Channel (PUCCH),
Physical Uplink Shared Channel (PUSCH),
Physical Sidelink Shared Channel (PSSCH),
Demodulation Reference Signal (DMRS), or
Sidelink Reference Signal (SL RS).

24. The UE of claim 14, wherein, to send the message to the network entity, the one or more processors are configured to send the message to:
a location server,
a serving transmission reception point (TRP) of the UE
a neighboring TRP of the UE, or
another UE.

25. The UE of claim 14, wherein the one or more processors are configured to transmit the wireless reference signal such that it is received by:
a serving TRP of the UE,
a neighboring TRP of the UE, or
another UE.

26. The UE of claim 14, wherein the or more processors are configured to receive the configuration from:
a location server, or
a serving TRP of the UE.

27. A device comprising:
means for receiving, at the device, a configuration to transmit a wireless reference signal, wherein the configuration is indicative of a time interval between a timing reference and a transmission timing of the wireless reference signal;
means for determining, responsive to receiving the configuration at the device, a timing quality metric based on the time interval, wherein the timing quality metric is indicative of an accuracy of the transmission timing of the wireless reference signal;
means for sending, from the device to a network entity, a message comprising the timing quality metric; and
means for transmitting the wireless reference signal with the device.

28. The device of claim 27, wherein the means for receiving the configuration comprise means for using, as the timing reference:
a timing of an uplink (UL) subframe of the device, or
a transmission timing of another wireless reference signal, or
both.

29. The device of claim 27, wherein:
the timing reference comprises a device Rx-Tx time difference indicative of a measurement by the device of a difference in time between a first detected path in time of a DL subframe received at the device and a beginning of a UL subframe closest in time to the DL subframe; and
the means for determining the timing quality metric comprise means for including, in the timing quality metric, an indication of a time difference between a first timing used in determining the device Rx-Tx time difference and a second timing used to transmit the wireless reference signal.

30. A non-transitory computer-readable medium storing instructions for communicating a timing quality metric for a wireless reference signal transmitted by a user equipment (UE), the instructions comprising code for:
- receiving, at the UE, a configuration to transmit the wireless reference signal, wherein the configuration is indicative of a time interval between a timing reference and a transmission timing of the wireless reference signal;
- responsive to receiving the configuration at the UE, determining, with the UE, the timing quality metric based on the time interval, wherein the timing quality metric is indicative of an accuracy of the transmission timing of the wireless reference signal;
- sending, from the UE to a network entity, a message comprising the timing quality metric; and
- transmitting the wireless reference signal with the UE.

* * * * *